(12) United States Patent
Mann et al.

(10) Patent No.: US 6,614,351 B2
(45) Date of Patent: Sep. 2, 2003

(54) COMPUTERIZED SYSTEM FOR AUTOMATICALLY MONITORING PROCESSING OF OBJECTS

(75) Inventors: Jorg Mann, Heidelberg (DE); Christian Merz, Waldkirch (DE); Axel Spriestersbach, Karlsruhe (DE); Albrecht Schmidt, Karlsruhe (DE); Hans-Werner Gellerson, Groetzingen (DE); Michael Beigl, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 11 days.

(21) Appl. No.: 09/732,993

(22) Filed: Dec. 7, 2000

(65) Prior Publication Data

US 2002/0080031 A1 Jun. 27, 2002

(51) Int. Cl.[7] ................................................ G08B 13/14
(52) U.S. Cl. ............................. 340/572.1; 340/572.4; 340/572.8; 340/10.42
(58) Field of Search .......................... 340/572.1, 572.4, 340/572.8, 10.1, 10.42, 5.8, 5.92; 235/439, 449, 462.01, 462.25, 462.43, 462.45, 462.46, 98 R

(56) References Cited

U.S. PATENT DOCUMENTS

| | | | | |
|---|---|---|---|---|
| 5,640,164 A | * | 6/1997 | Gunnarsson | 342/42 |
| 5,793,032 A | * | 8/1998 | Bard et al. | 235/472 |
| 5,850,187 A | * | 12/1998 | Carrender et al. | 340/825.54 |
| 6,002,344 A | * | 12/1999 | Bandy et al. | 340/10.1 |
| 6,039,258 A | * | 3/2000 | Durbin et al. | 235/472.01 |
| 6,152,369 A | * | 11/2000 | Wilz, Sr. et al. | 235/462.01 |
| 6,232,870 B1 | * | 5/2001 | Garber et al. | 340/10.1 |

OTHER PUBLICATIONS

Thierry Roz, et al., *Using Low Power Transponders and Tags for RFID Applications*, EM Microelctronic Marin SA, 8 pages.

* cited by examiner

*Primary Examiner*—Toan Pham
(74) *Attorney, Agent, or Firm*—Finnegan Henderson Farabow Garrett & Dunner, LLP.

(57) ABSTRACT

A worker carries a sensor that senses a tag device, preferably a passive RFID tag, in or on an article being processed. The sensor obtains wirelessly from the tag device identifying data, such as a numerical tag, which has been recorded as corresponding to a specific article. A computer connected with the receiver uses the identifying data to obtain a network address on a computer data network. Data relating to the worker contact with the article is sent over the network to the address accessed, and the server, or a management computer attached to it, causes a record to be stored reporting the access regarding the article, and other bookkeeping or process control activities are performed as claimed.

13 Claims, 5 Drawing Sheets

COMPUTERIZED SYSTEM FOR AUTOMATICALLY MONITORING PROCESSING OF OBJECTS

FIELD OF THE INVENTION

This invention relates to systems for monitoring objects which are being processed or moved by workers, and, more specifically, to systems for automatically monitoring the handling by workers of objects using tags in the objects.

DISCUSSION OF PRIOR ART

In many businesses, objects are handled by workers, and it is desirable from a management or industrial engineering standpoint to develop data regarding the interaction of workers with each object.

Computer hardware and software used to derive such data have traditionally been configured as "explicit" systems, in which the computer performs a task in reaction to a user input, such as typing on a keyboard or clicking on a mouse. In these systems, the computer takes no action if there is no input.

Explicit computer systems have been proposed that receive input relating to which objects workers are processing in a variety of ways. For example, in some systems, workers carry a bar code reader and scan each object that they work on. Similarly, a worker may be given systems such as a scanning pen input or a keyboard mounted on the worker's forearm to explicitly input processing data to an ERP system. However, the repeated action of scanning the bar code or the other data entry, in the aggregate, uses a substantial portion of the workers' time and may be very inconvenient. Also, more importantly, the act of data entry is an affirmative action that can be overlooked by the worker, resulting in missing and erroneous data.

Even approaches that make explicit interaction much simpler, such as voice recognition systems that the worker speaks to without a need for manual action to send data to a management system, have a number of difficulties, which are well known, and are still vulnerable to the worker failing to take the explicit action that triggers an input to the data collection system.

"Implicit" systems, i.e., systems that input data without any explicit action by the worker to trigger data entry, have also been suggested, but these systems are also vulnerable to the formation of erroneous data. For example, automatic bar code scanners have been used in conveyor belt systems, but these systems miss items, and also may not be usable in more random environments, such as package delivery rooms where objects are not arranged in a line.

The systems of the prior art therefore fail to offer adequately reliable data collection for monitoring the movement or handling of articles.

SUMMARY OF THE INVENTION

Accordingly it is the object of the present invention to provide an implicit interface system that overcomes the unreliability of the prior art, and that efficiently processes information about articles being processed or handled by one or more workers.

According to the present invention, a worker carries a sensor that senses a tag device associated with an article being processed by the worker. This tag device is preferably a passive tag in or on the article that can be wirelessly scanned to obtain tag-specific identifying data, such as a tag number, which has been earlier recorded as corresponding to the specific associated article.

A computer connected with the receiver uses the identifying data to obtain or derive a network address on a computer data network. The computer system then accesses this address on the network.

Preferably, data relating to the worker contact with the article is also sent over the network to the address, and the server, or a management computer attached to it, causes a record to be stored reporting the access regarding the article. Other information regarding the origin of the data and the access, i.e., time and place of contact with the article, the worker(s) involved, etc., may also be included in the record. This information may be integrated with other information used to monitor or control the processing of the articles.

The server may also access data regarding the article and transmit this data back to the sending computer for display to the worker accessing the article. Where desirable, further communications between the worker and the server are provided.

It is also an object of the present invention to provide a system that can be worn by a worker as part of the worker's clothing, preferably a glove containing a sensor that senses the tag devices in articles that the worker contacts.

Other objects and advantages of the invention will become apparent from the specification herein.

DETAILED DESCRIPTION

Figure 1:
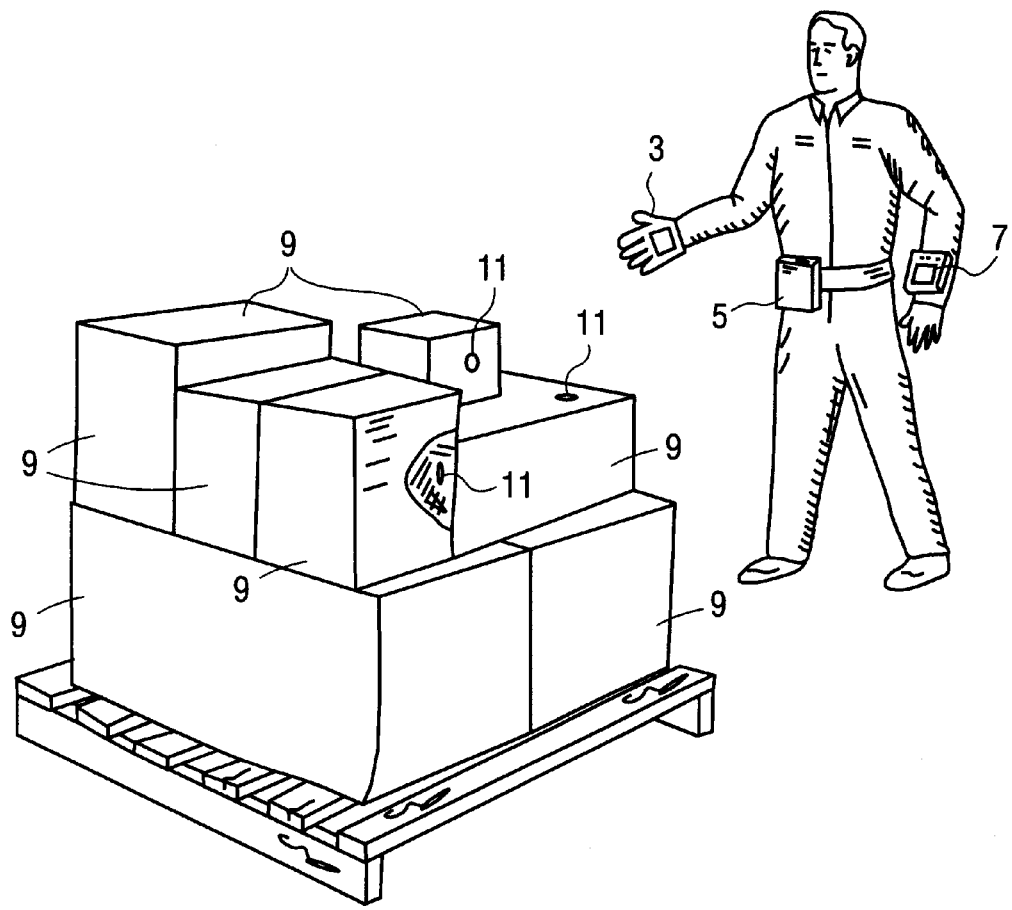
FIG. 1 is an illustration of a worker equipped with a system according to the preferred embodiment of the invention.

According to the systems and methods of the present invention, a worker is provided with a portable interactive system that includes a wearable sensing device, which may be part of the clothing of a worker, and is most preferably a glove 3 adapted to be worn on the hand of the user. FIG. 1 is an illustration of a worker equipped with a system according to the preferred embodiment of the invention.

The system also includes a central computer or processor 5 adapted to be worn on the belt of the user. The computer 5 is connected with the glove 3, and also, optionally, with a display 7, which may be configured to be worn on the forearm of the user, or on the user's belt, or elsewhere where it is not an inconvenience to the activities of the user. Instead of a cable connection, the computer 5 may have a wireless connection, e.g., Bluetooth, with the glove 3 and display 7, in which case the computer 5 need not be worn or carried by the worker.

According to the systems and methods of the invention, the articles 9 that are to be monitored are each equipped with a respective identifying device, such as tag device 11, which are preferably secured on the article or inside the article.

Figure 2:
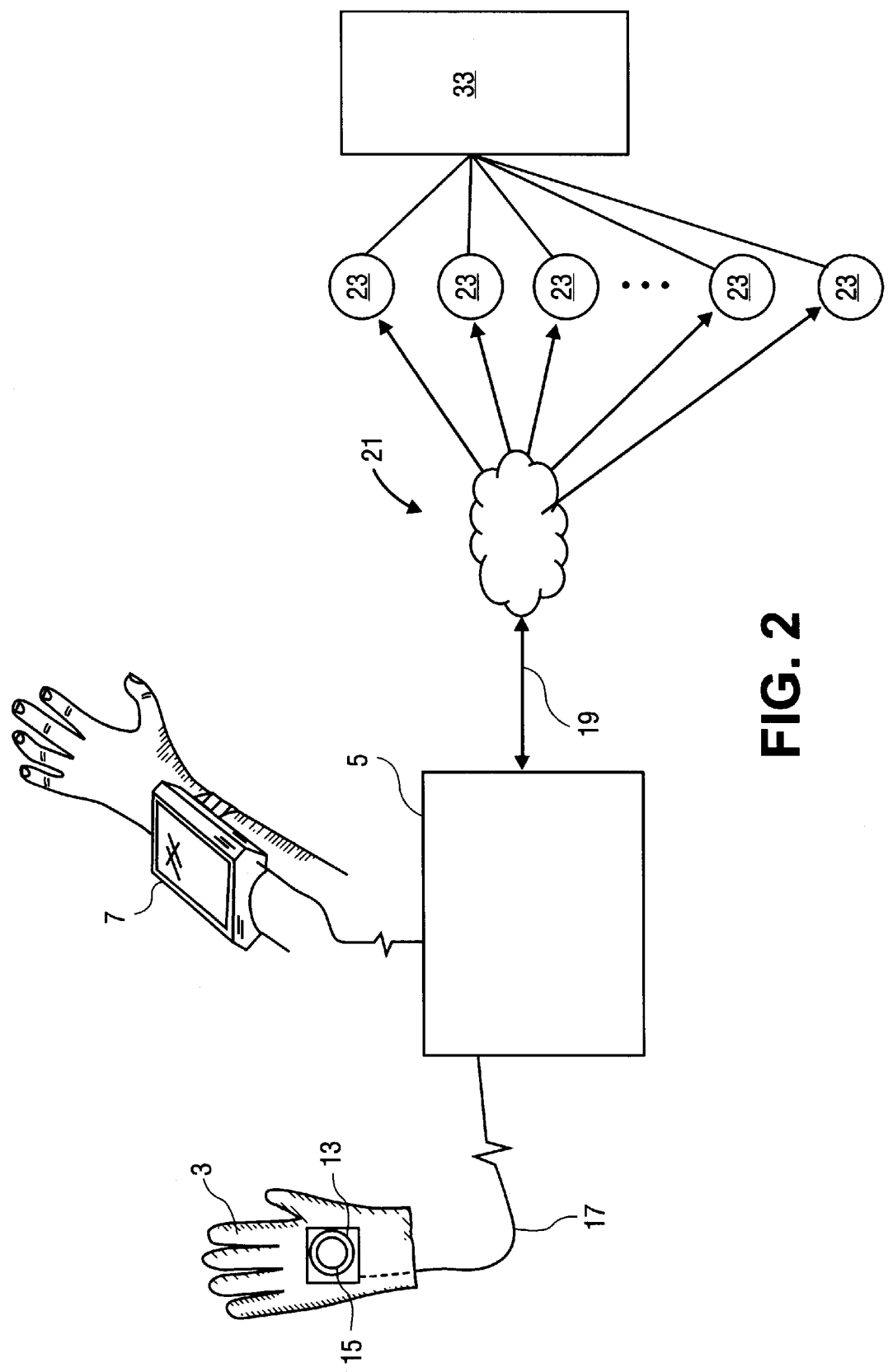
FIG. 2 is a diagram of the components of a portable unit for a system of the preferred embodiment.

A schematic of the portable system carried by a worker is shown in FIG. 2. According to the preferred embodiment, a piece of the clothing of the worker, preferably glove 3, is provided with a sensor device 13 that wirelessly interacts and obtains identifying data from the identifying devices 11 on those articles that are contacted by the worker.

The tag device 11 is preferably a passive electronic tag that provides data in response to some type of wireless interrogation with a non-visible signal or field. Especially preferred is a tag device that derives its power for communicating the identifying data of the tag device from the interrogating signal.

One such tag device is the read-only contactless identification device sold by EM Microelectronic-Marin SA of Marin, Switzerland under the model designation H-4001. This device is an RFID tag that is configured to be scanned by a low-frequency alternating magnetic field of approximately 150 mW power, with a frequency of 125 kHz. The field stimulates an oscillator circuit on a transponder chip of the tag device, and this oscillator circuit acts as a power supply for transponder electronics of the tag.

The activated transponder emits a code pattern to the resonance field. This modulation of the low-frequency field can be sensed and data can be obtained therefrom. This wireless interaction can carry up to 64 bits of data, a substantial portion of which are available to carry identification data for the article. The present manufacturer's specification allows for 32 bits of data, i.e., approximately 4 billion possible combinations.

Other systems of tag devices that can be implicitly sensed using invisible wireless signals or fields can be envisioned by those with skill in the art. For example, the tag may be a transponder device with a circuit that is configured to react to an RF signal of a certain frequency by transmitting back a responsive RF signal containing identifying data that is unique to the specific tag device.

According to the invention, the sensing device 13 wirelessly interacts with any tag devices 11 in proximity thereto and derives the identifying data from any tag device within detection range. Generally, the sensing device 13 scans to implicitly sense these tag devices.

Depending on the configuration of the tag devices used therewith, the sensing device 13 may scan continuously, periodically, or intermittently by emitting the appropriate wireless signal or field. The timing of the intermittent or periodic scans should be such that it is difficult or impossible for a worker wearing the sensing device to have contact with a tagged object that is not detected by the sensing device.

The sensor of the invention is configured to sense objects only at a restricted range so that the articles that are sensed are those which are in the immediate control of the worker, e.g., objects with tags that the worker actually picks up. In the preferred embodiment, the sensor in the glove communicates only with articles closer than a distance of about 3 inch (7.5 cm). However, greater threshold distances for detection may also be advantageously used according to the invention, depending on the type of data desired, the type of tags or articles, and the type of processing being monitored.

In the preferred embodiment, the sensing or receiving device 13 is a coil 15 placed in the palm portion of glove 3. The coil 15 continuously scans for tag devices by generating an alternating magnetic field. This field preferably has a frequency of about 125 kHz to resonate with the RFID tags of the preferred embodiment. The coil 15 also acts as a receiver to sense any nearby articles that have appropriate identifying tag devices 11 which resonate in response to this magnetic field and modulate data into the field.

The electronics associated with the sensing device 13 may be of a variety of configurations. In the preferred embodiment, however, the RFID tag preferably is interrogated by a reader such as the reader sold by IQ Automation GmbH of Freising, Germany, under the name EasyKey reader.

In the embodiment of FIG. 2, sensor 13 is connected by a wire 17 to the worker's computer 5, which is preferably worn on the belt of the worker. Computer 5 preferably is a small computer system which is equipped with a communications link 19 to a computer data network generally indicated at 21.

The connection 19 between the computer 5 and the computer data network 21 is preferably a wireless connection that allows the worker to walk around freely within an installation while the computer 5 remains in contact with the network 21. Alternatively, where limited movement of the worker is acceptable, the connection may be a flexible wire that connects the worker and the sensor 13 he is wearing to a stationary computer wired into the computer data network, but allows the worker a mobility within a limited range near the stationary computer.

The computer data network 21 may be an intranet, a limited area network (LAN), the Internet, or any other computer data network, as are well known in the art. The computer data network 21 communicates with one or more individual servers 23. These servers 23 are preferably connected, either by direct wiring or through the network 21, to management computer 33.

Figure 3:
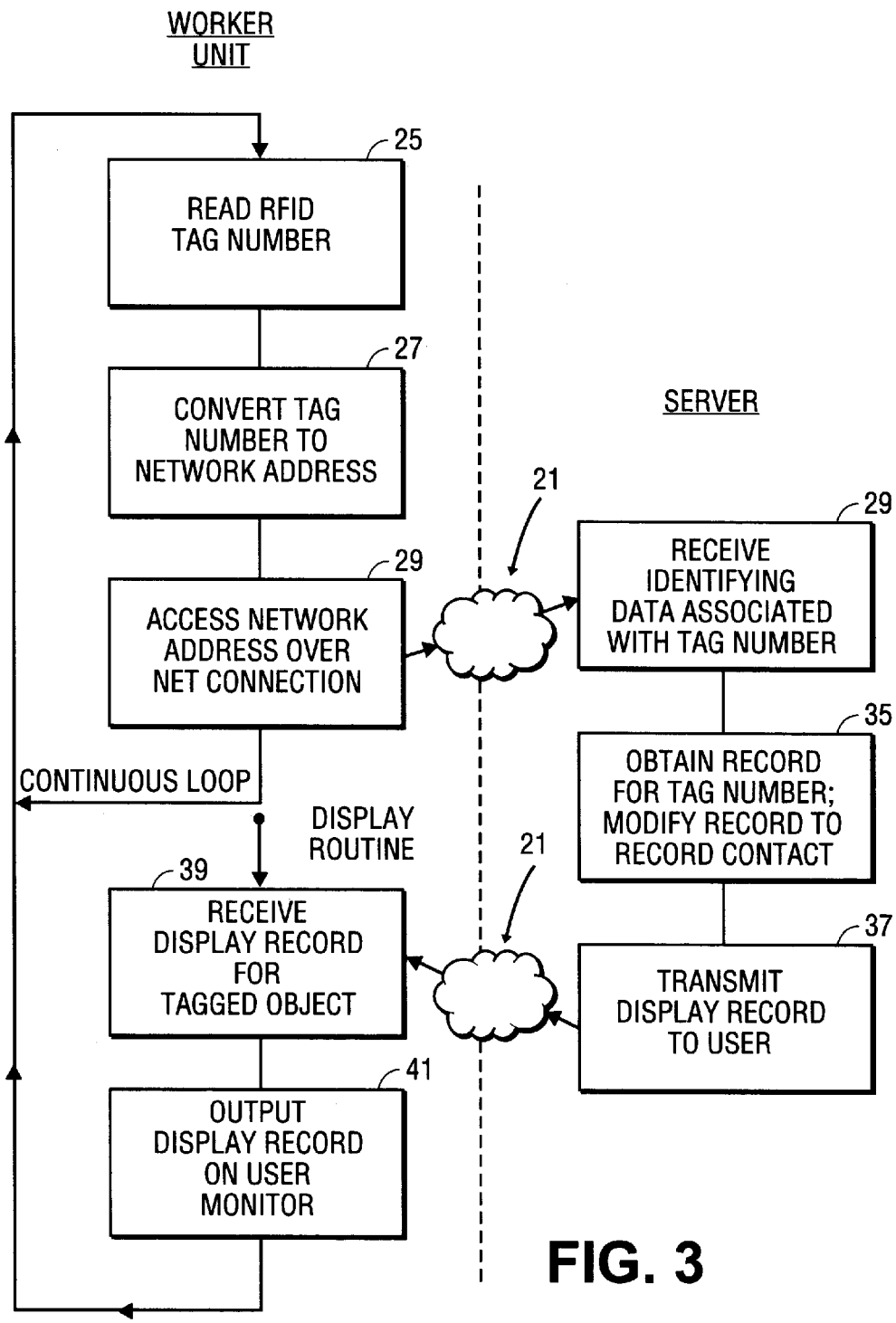
FIG. 3 is a flow chart illustrating the interaction of the worker's portable unit and a data network server.

Operation of the software of the computer 5 is illustrated in the flow chart of FIG. 3. The sensor continually scans for data from a tag device (step 25). When a tag device comes within the threshold distance from the sensor 13, the identifying data for the tag device is acquired by sensor 13 and converted to a signal which is transmitted along wire 17, and which is received by the computer 5.

The computer 5 converts the identifying data or tag number to a unique URL address for the computer data network 21 (step 27) corresponding to the tag number or its associated article. This is preferably accomplished using a look-up-table procedure, although different ways of determining or calculating addresses of this type are well known in the art.

The software of computer 5 includes a browser that can address individual network addresses or pages by using an internal URL or other addressing protocol appropriate for the network. Once the URL address is obtained, the computer 5 uses the URL address in its internal browser program to access the address on its respective server 23 over the computer data network 21 (step 29) The computer 5 transmits the tag device identifying data to the address accessed, and this data is received by the server (step 31). The data which is transmitted by the worker computer 5 preferably also includes data that identifies the worker and the worker's location, together with the time and date of the access of the article.

The accessed server 23 then accesses the data record for the specific tag number identified by the accessing computer 5. In the case of a smaller system having a single server that performs all processing of data regarding the articles, this may be as simple as accessing a mass storage device which stores the data records for the articles being managed, indexed by tag number. In a larger system, such as is shown in the preferred embodiment of FIG. 2, the server 23 accesses the records through a separate management computer system 33, transmitting to, or receiving from, management system 33 data regarding the individual article identified by the tag number.

The management system 33 is preferably an Enterprise Resource Planning (ERP) or inventory management system, which allows for data processing of large amounts of data for a large number of tagged articles. In the preferred embodiment, the management system 33 is the R/3 system sold by SAP AG, of Walldorf, Germany.

Once the record for the specific tag on the associated article is obtained, a number of operations are performed.

First, the data record for the article can be updated to record the present contact of the worker with the article, recording time and day of contact, as well as the identification and location of the worker from whom the data access of the server 23 (step 35) originated.

Second, information from the data record is converted to data for display to the worker, and the data is transmitted back to the accessing worker computer unit 5 via the computer data network 21. When the computer 5 receives the display data (step 39), a display is prepared and transmitted to the monitor device 7, which displays the data on its screen to the worker (step 41). The computer 5 then returns to its primary function of scanning for tag devices 11 in or on nearby articles. Preferably, the software is operated by a call-back process wherein the software is activated responsive to a receipt of the serial data by the wireless communication with of the tag device. This also may be accomplished by the program running in a continuous loop, preferably repeated at least every $1/10$ to $1/4$ of a second or at whatever rate is appropriate to the given situation so that all tags contacted by the user will be sensed and processed by computer 5.

Additional management and inventory activities based on the contact of the worker with the article may also be performed by the management computer 33.

Figure 4:
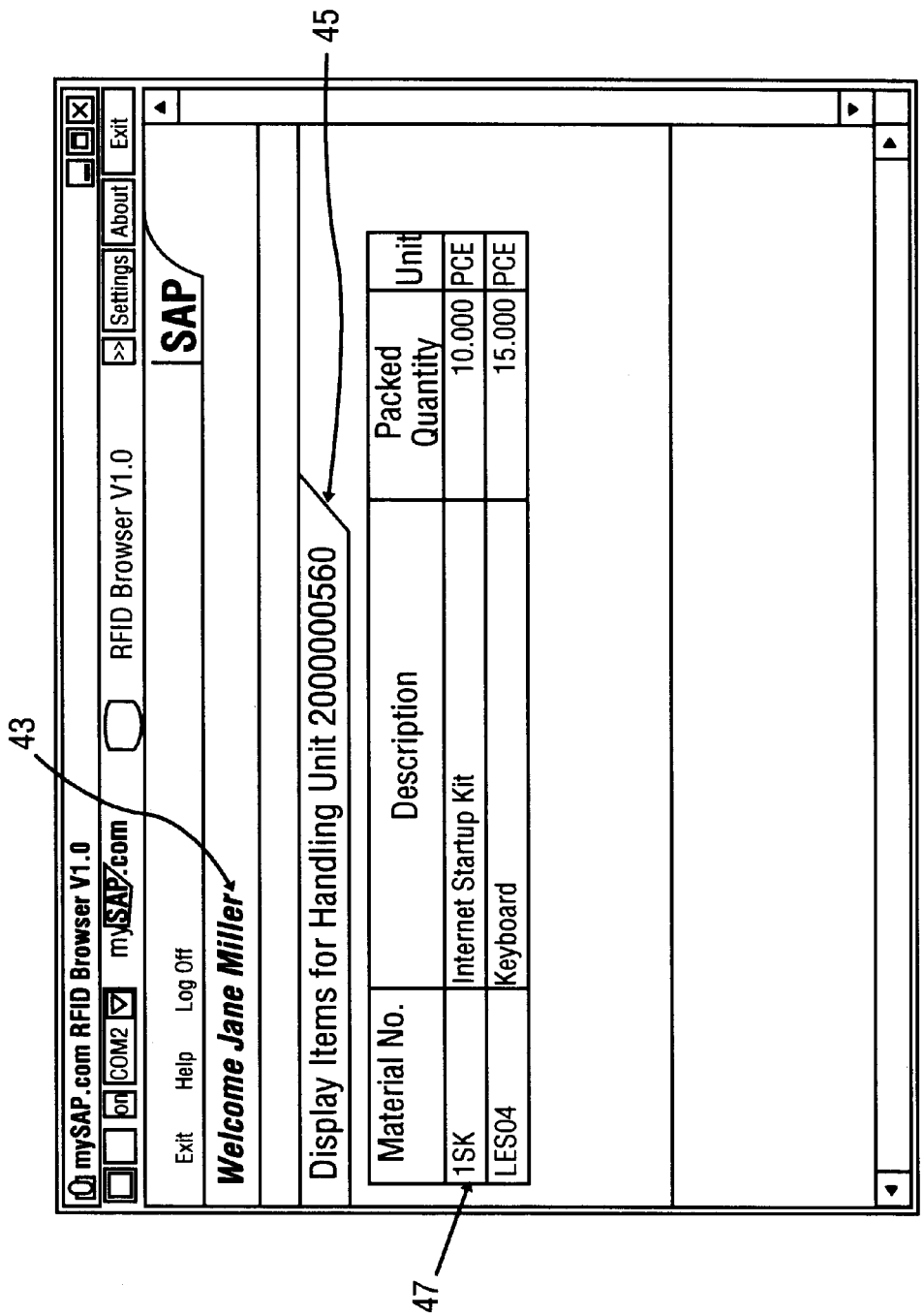
FIG. 4 is an example of a display shown to a worker on a display screen on the portable unit.

FIG. 4 shows an example of a display image shown to a worker on display device 7 for an article identified by its tag. The computer 5 runs a browser on the computer data network, and this browser prepares the display. The browser display shows the worker name in a field 43 and also shows the identifying article number associated with the tag which has been contacted in another field 45. Additional information, such as a list of the contents of the article, where the article is a box of parts, may be shown within a general information field 47.

In a similar fashion, more complex methods of displaying data may also be used, especially where the worker's activity requires more knowledge or interaction with the management system, such as when the worker is a quality inspector for the facility. In such a case, an expanded display, such as shown in FIG. 5, may be used.

Figure 5:
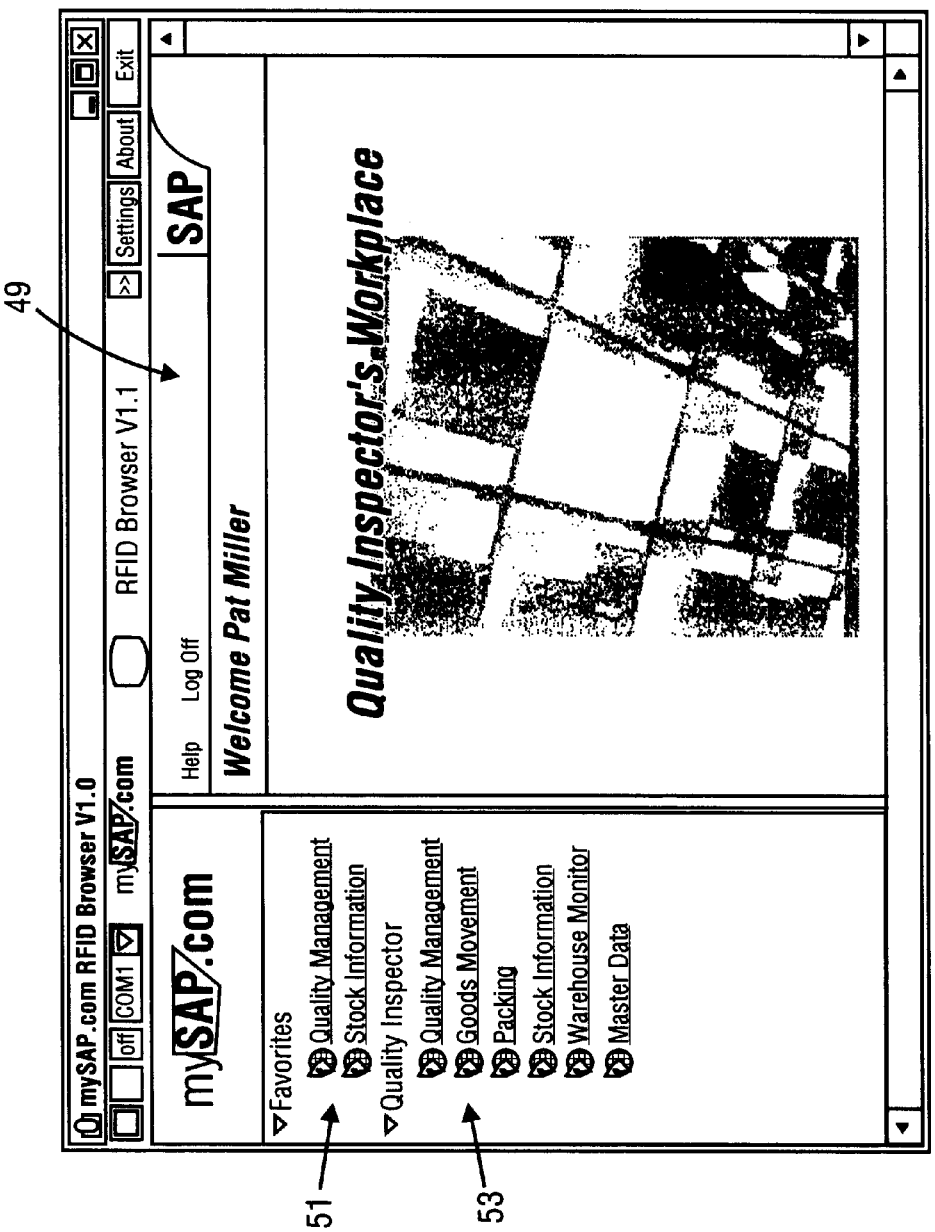
FIG. 5 is an example of an enhanced display which is shown to a different type of worker that requires more information to perform his task, e.g. a quality control officer.

The display of FIG. 5 is displayed using the browser of computer 5 and display device 7. The page shown displays the name of the logged-on user in data area 49, and also provides a list of potential web site locations 51 and 53 to which the worker can go to transmit or derive more information. These locations may be accessed by the computer browser program by an input device associated with the display device 1, such as a touch sensitive screen which allows the user simply to touch the selection to access the URL, or alternatively by a manual mouse, joystick, keypad or keyboard input arrangement. When a link is opened in this way, the browser in computer 5 accesses the appropriate network address and provides thereto any necessary information regarding the worker, the article, etc. This affords the worker a broad range of interactive communication over the computer data network 21.

The terms used in herein should be considered to be terms of description, not limitation, as those of skill in the art, having this specification before them will be able to make changes and variations therein without departing from the spirit of the invention.

What is claimed is:

1. A system for administering processing of a number of articles, said system comprising:

a number of identifying devices each in or secured to a respective article;

a plurality of portable processing systems for use by a plurality of users, said portable processing systems each comprising:

a glove having a tag sensing device, said tag sensing device transmitting an alternating magnetic field, said alternating magnetic field having a frequency;

the identifying devices each being a passive tag device that coacts with the magnetic field when within a threshold distance from the tag sensing device so that the tag sensing device derives therefrom data including data identifying the identifying device relative to the other identifying devices;

a data processor operatively associated with the tag sensing device and receiving therefrom a data signal, said data signal containing the identifying data, said data processor having a wireless communication link to a computer data network; and a display device connected with the data processor for displaying information to the user;

each of the identifying devices having a respective unique network address corresponding thereto, the data processor converting said identifying data in said data signal to the unique network address for the identifying device, and accessing said network address over the computer data network;

a plurality of servers connected with the computer data network, said servers supporting said network addresses;

said data processor transmitting data identifying the tag device and event data identifying the user and a location of the user to the network address over the computer data network, said servers being connected with a computerized resource management system, said servers transmitting to said resource management system management data derived from the identifying data and the event data received thereby;

said management system accessing a data record indexed based on the identifying data;

said management system recording said management data or data derived therefrom;

said management system preparing and transmitting display data including data derived from the data record to the respective server;

the server transmitting the display data to the respective portable processing system; and the portable processing system displaying the display data to the user on the display device.

2. The system of claim 1 wherein the data processor is connected with the tag sensing device with a wireless connection.

3. The system of claim 2 wherein the data processor is in a stationary position while the user moves with the tag sensing device.

4. A method for processing data derived from a number of articles being processed by one or more human users, said method comprising:

providing each of said articles with a respective identifying device each having respective identifying data distinguishing from the identifying data of the other identifying devices;

providing to each of said users a portable processing unit having a sensor configured to implicitly sense the identifying devices when said device is within a threshold detection distance from the sensor and to receive at the portable processing unit identifying data identifying the tag device and the article with which it is associated;

storing a data record for the article indexed by the identifying data or by an identifier derived therefrom;

converting the identifying data to a network address on a computer data network;

transmitting the identifying data or data derived therefrom to the network address over the computer network; and using receipt of the identifying data or data derived therefrom to the network address over the computer network; and using receipt of the identifying data or data received therewith from the portable processing unit to alter processing of the associated article.

5. A method for acquiring data regarding processing of a number of articles by workers, said method comprising:

providing a respective tag device in or on each of the articles, said tag devices each having identifying data distinguishing each tag device from all of the other tag devices;

providing to each of said workers a respective portable unit having a wireless communication link with a computer data network having thereon a plurality of network servers, said portable unit further having a sensor connected therewith in a glove adapted to be worn by the user;

scanning with said sensor for tag devices;

detecting one of the tag devices when said tag device is within a threshold detection distance from the sensor and obtaining from said tag device the identifying data thereof;

deriving from the identifying data a network address for the computer data network which is unique to the respective tag device;

transmitting data identifying the tag device to the address over the wireless communication link on the computer data network;

receiving the data transmitted at a server supporting the network address and using the data to access a data record corresponding to the article associated with the tag device;

recording the contact of the worker with the article;

preparing display data from the data record of the article;

transmitting the display data over the network to the originating portable unit;

displaying a display derived from said display data on a display device connected with the portable unit.

6. The method of claim 5, wherein said scanning comprises generating in the sensor an invisible signal which wirelessly coacts with the tag device so that the sensor obtains therefrom the identifying data.

7. The method of claim 6, wherein said signal is an RF signal.

8. The method of claim 5 wherein the scanning comprises generating a magnetic field which is influenced by the tag device.

9. The method of claim 8 wherein the magnetic field is an alternating magnetic field having a frequency which resonates with the tag device.

10. The method of claim 5 and receiving an input from the worker at the portable unit and accessing an address on the network responsive thereto.

11. The method of claim 5 and said scanning being continuous.

12. The method of claim 5 and said scanning being periodic.

13. The method of claim 5 and said scanning being intermittent.

* * * * *

UNITED STATES PATENT AND TRADEMARK OFFICE
CERTIFICATE OF CORRECTION

PATENT NO.     : 6,614,351 B2
DATED          : September 2, 2003
INVENTOR(S)    : Jorg Mann et al.

It is certified that error appears in the above-identified patent and that said Letters Patent is hereby corrected as shown below:

Title page,
Item [75], Inventors, "Gellerson," should read -- Gellersen, --.

Column 7,
Lines 17-19, delete "using receipt of the identifying data or data derived therefrom to the network address over the computer network; and".

Column 8,
Line 25, "influenced" should read -- influcenced --.

Signed and Sealed this

Twenty-third Day of December, 2003

JAMES E. ROGAN
*Director of the United States Patent and Trademark Office*